2 Sheets—Sheet 1.

I. & A. HERZBERG,

Assignors to the HOLMES BURGLAR ALARM TELEGRAPH CO.

Apparatus for Producing Forward and Backward Motion at Regular Intervals.

No. 8,753. Reissued June 17, 1879.

Attest:
C. Clarence Poole
H. F. Newbury

Inventor:
Isaac Herzberg and Abram Herzberg
by Saml. A. Duncan
Atty.

I. & A. HERZBERG,
Assignors to the HOLMES BURGLAR ALARM TELEGRAPH CO.

Apparatus for Producing Forward and Backward Motion at Regular Intervals.

No. 8,753. Reissued June 17, 1879.

Attest:
C. Clarence Poole
H. F. Newbury

Inventor:
Isaac Herzberg and Abram Herzberg
by Saml. A. Duncan
Atty

UNITED STATES PATENT OFFICE.

ISAAC HERZBERG AND ABRAM HERZBERG, OF PHILADELPHIA, PENNSYLVANIA, ASSIGNORS TO THE HOLMES BURGLAR ALARM TELEGRAPH COMPANY, OF NEW YORK CITY.

IMPROVEMENT IN APPARATUS FOR PRODUCING FORWARD-AND-BACKWARD MOTION AT REGULAR INTERVALS.

Specification forming part of Letters Patent No. 125,679, dated April 16, 1872; Reissue No. 8,752, dated June 17, 1879; application filed May 22, 1879.

DIVISION A.

*To all whom it may concern:*

Be it known that we, ISAAC HERZBERG and ABRAM HERZBERG, of the city of Philadelphia and State of Pennsylvania, have invented a certain new and useful Improvement in Apparatus for Producing Forward-and-Backward Motion at Regular Intervals; and we do hereby declare the following to be a full, clear, and exact description of the same, reference being had to the accompanying drawings, making part of this specification.

Our invention relates to the use, in combination with a time-movement, of an oscillating lever, a continuously-revolving device, and an adjustable mechanism, the several parts being so constructed and relatively arranged, as more fully hereinafter explained, that the rotary motion primarily produced by the time mechanism will be converted into an oscillating motion, recurring periodically at intervals, of greater or less extent, according to the adjustment that for the time being may have been given to the parts made capable of adjustment for such purpose.

This mechanism will be found useful in many connections, where it may be desired to convert rotary motion into oscillating or a backward-and-forward motion, or where it may be desired to check and to permit motion of any kind at regularly-recurring intervals.

The invention is fully illustrated in the accompanying drawings, in which—

Figure 1:
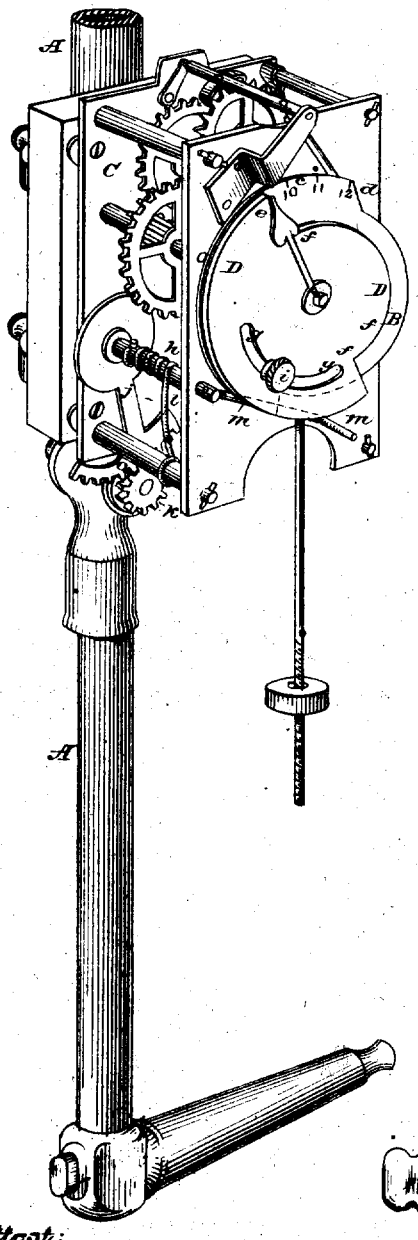
Figure 2:
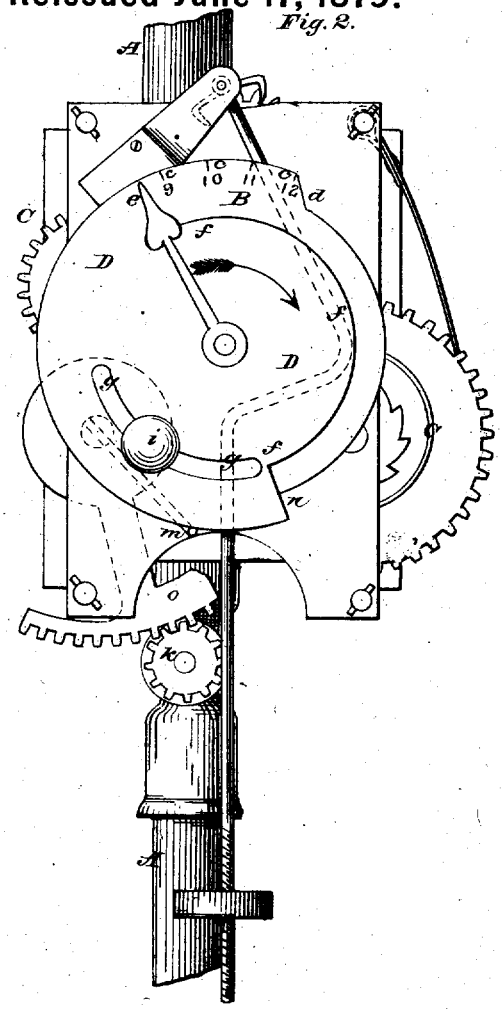
Figure 2:
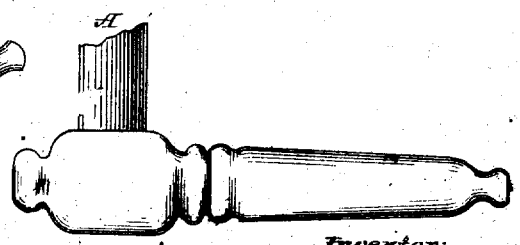
Figure 3:
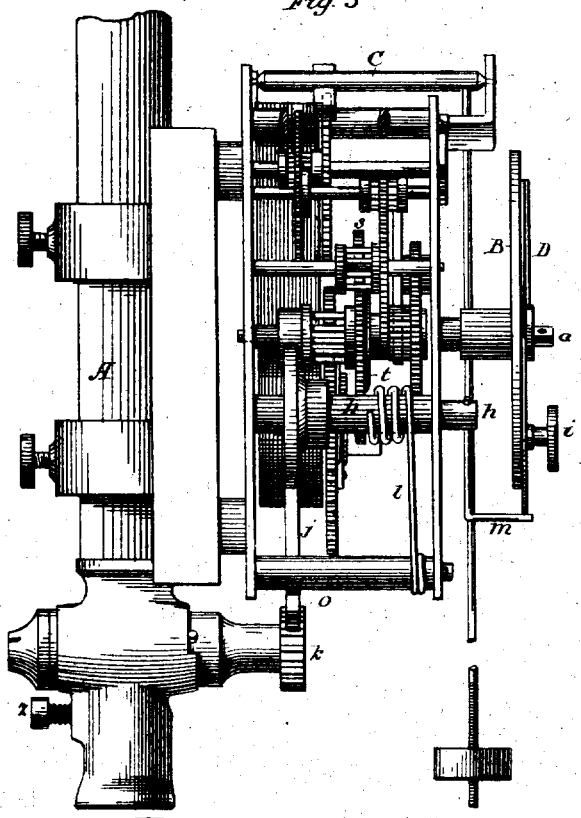
Figure 4:
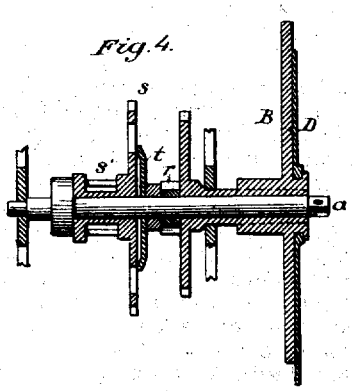
Figure 7:
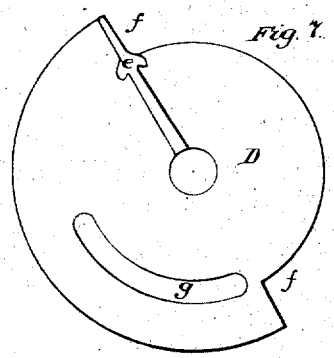
Figure 5:
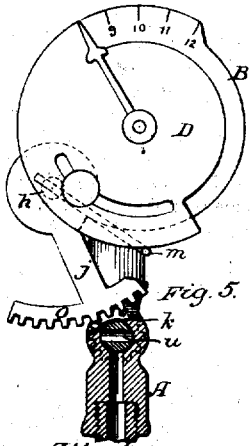
Figure 6:
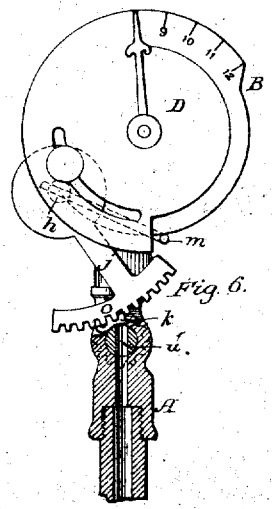
Figure 8:
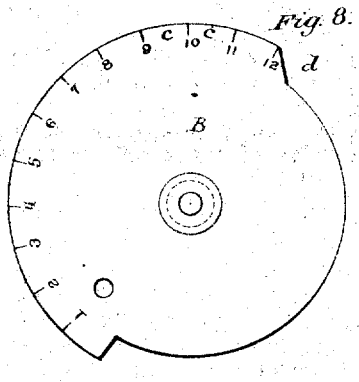

Figure 1 represents the movement, in perspective, as applied to operate the rotating block or valve of a gas-cock, to check and permit alternately the full flow of gas. Fig. 2 is a front elevation of the same. Fig. 3 is a side elevation. Fig. 4 is a sectional view of the parts mounted on the main spindle or arbor of the time-movement, and specially designed to show the position of the frictional washer *t*. Figs. 5 and 6 are two sectional views, showing how the movement may be used to produce an oscillating motion in a rotating block or obstruction-piece, as in the valve of a gas-cock. Figs. 7 and 8 are plan views, respectively, of the two disks or wheels B and D, which, when superimposed, make up the compound cam-wheel B D, shown in Figs. 1 and 2.

A represents any suitable support to which the time mechanism and its connected parts may be attached. On this support is a clock or similar mechanism, C, that may be driven by the expansion of a coiled or other spring. This mechanism, being of a common and well-known construction, and shown in the drawings, need not be elaborately described. The sleeve on the spindle *a*, however, which in an ordinary clock is the one on which the hour-hand is placed, and there makes one revolution in twelve hours, in our construction is so geared as to make but one revolution in twenty-four hours. On this sleeve there is mounted, so as to turn with it, a circular dial-plate or time-table, B, which has upon it hour-marks *c*, or marks representing divisions of an hour; and upon the perimeter of this time-table wheel there is a cam-projection, *d*, designed for operating an oscillating lever, for a purpose hereinafter described.

This cam-projection can be varied within desired limits by the following means: Over the sleeve of spindle *a*, but so that it may be turned independently of such sleeve when desired, there is placed a second plate or wheel, D, a portion of the perimeter of which is cut away, as at *f f*, the diameter of the remaining portion being the same as that of the cam-projection on the wheel B. This second plate is constructed with a concentric slot, *g*, and is provided with a set-screw, *i*, which passes through this slot and takes into the plate B, thereby enabling the two wheels to be clamped to each other in any desired relation that the extent of the slot *g* will permit, so that they will revolve together under the action of the clock-work or other driving gear or mechanism, and thus for the time be practically combined into one compound wheel. This capacity for relative adjustment possessed by the two wheels enables the common cam-projection to be enlarged or diminished at pleasure, the common depression in the perimeters being at the same time correspondingly diminished or increased.

Pivoted in working relation to the compound wheel B D is the bent lever *h*, one arm of which, *m*, rides upon the perimeter of the wheel, which thus constitutes for such lever-arm a moving support, the cam portion of which raises and sustains the lever, while the depressed part permits it to return to its former position, a spring, *l*, being used to produce this last action. The other arm, *j*, of this lever moves synchronously with the arm *m*, and thus acquires an automatic periodical oscillating motion, dependent upon the time mechanism, and repeated once in each twenty-four hours, the relative times of the two successive phases of any one complete movement of the lever depending upon the adjustment of the cam-projection upon the wheel revolved by the spindle *a*.

The plate D is provided with an indicator, *e*, which points to the marks denoting divisions of time upon the dial-plate B, and thus aids in adjusting the two plates relatively to each other.

The figures shown at *c*, in connection with the marks indicating divisions of time, represent the number of hours that will be required for the depression in the perimeter of the compound wheel to pass under the arm *m* of the lever in the various adjustments effected by so clamping the two plates that the indicator points to these several figures respectively. The remaining portion of the twenty-four hours will be required for the cam or raised part of the perimeter to pass under the arm of the lever.

It is plain to see that by turning the wheel B forward, as one would turn the hour-hand of an ordinary clock, the cam *d* can be made to begin its action upon the lever-arm *m* at any desired hour of the day. This adjustment can be made readily, since by the application to the compound cam of force sufficient to overcome the friction of the spring-washer *t*, Fig. 4, interposed between the fixed pinion *r* and the wheel *s*, the arbor can be turned within the wheel *s* and its pinion *s'* until the compound cam reaches the desired point, when upon the cessation of the force thus applied the parts assume their normal action—*i. e.*, the spring-washer acts to hold the wheel *s* fast to the arbor, so that the latter, carrying the cam with it, rotates with the former. Now, as the length of the cam also can be regulated at pleasure, as above described, it follows that by this twofold adjustment both the forward and the backward movement of the lever can be made to begin at any required hour of the twenty four. The adjustment once made, these forward and backward movements of the lever, beginning at the established hours, will continue automatically so long as the time mechanism is kept wound up.

The movements of the arm *j* of the lever, being effected and regulated as above indicated, can be readily utilized for various kinds of work, where it is required to produce an oscillating or a backward and forward motion at regular intervals, and particularly when it is required that the two phases of a complete movement shall occupy twenty-four hours and shall be capable of adjustment, as to the length of time respectively consumed, relatively to each other.

One mode of thus utilizing this movement is illustrated in the drawings, in which a toothed sector-plate, *o*, is shown as attached to the arm *j* of the lever *h*, and this sector-plate meshes with the cogged pinion *k* upon a rotating block or dog, which forms the gate or valve of a gas-cock, the size of the pinion being such that the throw of the lever, by the action of the time mechanism, will, at the predetermined hour, shift the gate or valve of the gas-cock, and thus cut off or check the full supply of gas, and again, at a predetermined hour, remove the check or obstruction and permit the gas to flow, all as more fully set forth in Division B of this reissue, which specially relates to such application of the mechanical movement which forms the subject of this division.

What is claimed as new is—

1. The combination, substantially as described, of a time mechanism and an oscillating lever, one arm of which comes in contact with and rests upon a moving support actuated by the time mechanism, and made adjustable, so that the lever is lifted automatically at any predetermined hour, and held in the raised position for a variable space of time, dependent upon the adjustment of such moving support.

2. The combination, substantially as above described, of an oscillating lever and a continuously-revolving dial operated by a time-movement, and provided with mechanism made adjustable, so that the lever is lifted automatically at any predetermined hour, and held in the raised position for a variable space of time, according to the special adjustment of the parts.

3. The combination, substantially as described, of an oscillating lever and a continuously-rotating cam made adjustable, so that the lever is moved in the one direction and permitted to move in the other periodically, at hours determined, relatively to each other, by the special adjustment of such cam.

4. The combination of the spindle of a time mechanism and an extensible cam mounted thereon, and arranged to rotate once in twenty-four hours, substantially as and for the purpose described.

5. The combination of a time-movement, a continuously-rotating device actuated thereby, an oscillating lever arranged to be lifted by such device, and suitable intermediate and adjustable mechanism for holding the lever in the raised position and regulating relatively to each other the hours at which the lever rises and falls.

6. The combination of a time-movement, a continuously-rotating device actuated thereby, an oscillating lever arranged to be lifted by such device, and suitable intermediate mechanism for holding the lever in the raised position, and having a twofold adjustability for regulating relatively to absolute time and to each other the hours at which the lever rises and falls.

7. The combination of a time-movement, a continuously-rotating device actuated thereby, an oscillating lever, and an interposed dial and adjustable mechanism, by means of which the time-movement is caused to move the lever and hold it or permit it to be moved and held at predetermined hours and for predetermined periods of time, substantially as and for the purposes described.

8. In combination with a checking device or obstruction movable directly by an oscillating lever, a time-movement actuating a continuously-rotating device, which is made adjustable, so that the lever is thereby lifted automatically at any predetermined hour, and held in the raised position for a variable space of time, substantially as described.

ISAAC HERZBERG.
ABRAM HERZBERG.

Witnesses:
EUGEN WEISS,
H. F. NEWBURY.